United States Patent
Fenny et al.

(10) Patent No.: US 12,313,101 B2
(45) Date of Patent: May 27, 2025

(54) THERMAL HYDRAULIC ACTIVE WARMING SYSTEM

(71) Applicant: Bell Textron Inc., Fort Worth, TX (US)

(72) Inventors: Carlos Alexander Fenny, Fort Worth, TX (US); David Perry Schultz, Grand Prairie, TX (US); Robert Reynolds, Euless, TX (US); Rodney Cahoon, Argyle, TX (US)

(73) Assignee: Textron Innovations Inc., Providence, RI (US)

( * ) Notice: Subject to any disclaimer, the term of this patent is extended or adjusted under 35 U.S.C. 154(b) by 421 days.

(21) Appl. No.: 17/519,321

(22) Filed: Nov. 4, 2021

(65) Prior Publication Data

US 2022/0402627 A1    Dec. 22, 2022

Related U.S. Application Data (60) Provisional application No. 63/212,296, filed on Jun. 18, 2021.

(51) Int. Cl.
| | | |
|---|---|---|
| *F15B 21/0427* | (2019.01) | |
| *F15B 1/26* | (2006.01) | |
| *F15B 15/14* | (2006.01) | |
| *F15B 15/20* | (2006.01) | |

(52) U.S. Cl.
CPC ............ *F15B 21/0427* (2019.01); *F15B 1/26* (2013.01); *F15B 15/1485* (2013.01); *F15B 15/20* (2013.01); *F15B 2211/41563* (2013.01); *F15B 2211/426* (2013.01); *F15B 2211/45* (2013.01); *F15B 2211/62* (2013.01)

(58) Field of Classification Search
CPC ........ F15B 1/26; F15B 15/1485; F15B 15/20; F15B 21/0427; F15B 21/042; F15B 2211/41563; F15B 2211/426; F15B 2211/45; F15B 2211/62
See application file for complete search history.

(56) References Cited

U.S. PATENT DOCUMENTS

| | | | | |
|---|---|---|---|---|
| 4,373,869 A | * | 2/1983 | Martin | .................... F04B 49/10 |
| | | | | 60/329 |
| 6,173,572 B1 | * | 1/2001 | Cobo | .................... E02F 9/2203 |
| | | | | 60/327 |
| 9,803,665 B2 | * | 10/2017 | Beschorner | ............. E02F 9/226 |
| 11,384,834 B2 | * | 7/2022 | Kallas | ..................... F15B 13/04 |
| 2019/0037759 A1 | * | 2/2019 | Aposhian | .............. F15B 13/027 |
| 2019/0338793 A1 | * | 11/2019 | Uhlman | ................ F15B 20/005 |

FOREIGN PATENT DOCUMENTS

JP       6782183 B2 * 11/2020    ................ E02F 9/22

OTHER PUBLICATIONS

JP6782183B2_t machine translation thereof (Year: 2020).*

* cited by examiner

*Primary Examiner* — Matthew Wiblin
(74) *Attorney, Agent, or Firm* — Bradley Arant Boult Cummings LLP (57) ABSTRACT

An aircraft thermal hydraulic active-warming system includes an active thermal-warming valve interoperably coupled between a hydraulic pressure line and a hydraulic low-pressure return line and a hydraulic actuator arranged in parallel with the active thermal-warming valve between the hydraulic pressure line and the hydraulic low-pressure return line.

16 Claims, 11 Drawing Sheets

THERMAL HYDRAULIC ACTIVE WARMING SYSTEM

TECHNICAL FIELD

The present invention relates generally to systems and methods used to warm aircraft components in cold temperatures and more particularly, but not by way of limitation, to systems and methods for warming aircraft hydraulic system components.

BACKGROUND

This section provides background information to facilitate a better understanding of the various aspects of the disclosure. It should be understood that the statements in this section of this document are to be read in this light, and not as admissions of prior art.

Maintaining adequate temperature of aircraft components in cold environments is important in order to ensure that aircraft envelope requirements are maintained and to protect against component failure. Viscosity of hydraulic fluid in hydraulic systems of the aircraft is a primary consideration, since hydraulic fluid becomes more viscous as temperatures decrease.

Efforts to ensure adequate hydraulic-fluid viscosity and hydraulic-system performance have included passive warming systems and sizing of hydraulic-system components, including sizing of hydraulic lines.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

An aircraft thermal hydraulic active-warming system includes an active thermal-warming valve interoperably coupled between a hydraulic pressure line and a hydraulic low-pressure return line and a hydraulic actuator arranged in parallel with the active thermal-warming valve between the hydraulic pressure line and the hydraulic low-pressure return line.

An aircraft thermal hydraulic active-warming method includes warming hydraulic fluid by an active thermal-warming valve interoperably coupled between a hydraulic pressure line and a hydraulic low-pressure return line, operating a hydraulic actuator arranged in parallel with the active thermal-warming valve between the hydraulic pressure line and the hydraulic low-pressure return line, and controlling the active thermal-warming valve via a control computer interoperably coupled to the active thermal-warming valve.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Maintaining adequate temperature of aircraft components in extremely cold ambient temperatures (e.g., −40° F.) is often a challenge. This is often due to the necessity of maintaining hydraulic-fluid temperature at acceptable levels for operation of the aircraft.

If the aircraft is a helicopter, maintaining adequate hydraulic-fluid temperature is often a particular challenge at a tail rotor of the aircraft. This is due, at least in part, to the fact that the tail rotor is typically located relatively far away from pumps and gearboxes of helicopter, which components tend to increase hydraulic-fluid temperature.

Thermal-warming valves have been used to increase hydraulic-fluid temperatures in aircraft. Such valves usually work by introducing leaks into the hydraulic system via hydraulic fluid flowing through an orifice to generate heat. Such valves are typically passive and operate in response to temperature thresholds.

However, hydraulic fluid used for operation of such warming valves is the same fluid that is needed to operate hydraulic actuators of the aircraft. In such cases, hydraulic pumps can be increased in size or an envelope within which the aircraft operates can be decreased in order to maintain necessary operational capabilities of the hydraulic system.

In addition, hydraulic warming valves that operate at times when hydraulic actuators are not being used may be employed. In many aircraft, it is difficult to know when the hydraulic actuators will and will not be operating. For example, flow meters are often not adequate for determining when hydraulic actuators are operating. High-speed transient actuator usage often occurs before a flow meter would be able to detect actuator usage.

In a fly-by-wire aircraft, before the actuators have received instructions to operate, a flight control computer ("FCC") knows instructions to be provided to the actuators; therefore, the FCC knows ahead of time, for example, how much hydraulic fluid will be needed by the actuators. As such, a thermal hydraulic active-warming system ("THAWS") under FCC control is possible.

Since the thermal hydraulic active-warming system is controlled by the FCC, warming flow using hydraulic fluid can be performed only when the warming flow is available due to actuator operation levels; in similar fashion, when the warming flow is not available because of actuator operation levels, the FCC will modulate warming flow accordingly.

In an aircraft application in which there are long hydraulic-fluid lines, significant hydraulic-line heat loss can occur. In a typical embodiment, a thermal hydraulic active-warming system is integrated into overall aircraft design so that the hydraulic-fluid temperature is raised above a minimal operational temperature closer to an optimal operational temperature. Reasons for raising the hydraulic-fluid temperature include reduction in weight and size of hydraulic-system components due to lower viscosity of hydraulic fluid at higher temperatures.

Kinematic viscosity of hydraulic fluids typically used in commercial and military aircraft decreases logarithmically in response to increases in temperature. For example, viscosity of MIL-H-87257 hydraulic fluid is on the order of 10,000 centistokes at −80° F. and on the order of 4 centistokes at 100° F. The kinematic viscosity of a typical hydraulic fluid, such as MIL-H 87257 or MIL-H 83282, doubles approximately every 20° F. decrease in temperature. For example, if the operational hydraulic-fluid temperature is increased from 0° F. to 40° F., the kinematic viscosity decreases ~73%.

As a further example, hydraulic line diameters can be made much smaller if hydraulic-fluid kinematic viscosity can be decreased by virtue of greater hydraulic-fluid operational temperatures. At a baseline of 40° F., if the hydraulic fluid is pushed through a ⅝" line at 5 gallons/minute ("GPM") at 20 centistokes of kinematic viscosity, a pressure drop in a hydraulic low-pressure return line of about 1.5 psi per foot and in a hydraulic pressure line of 1.7 psi per foot result.

If the same hydraulic fluid were pushed through the same line at 0° F., the pressure drop would increase by a factor of 4 in the hydraulic low-pressure return line and by almost a factor of 4 in the hydraulic pressure line. One way to reduce the pressure drop would be to use a bigger hydraulic line. If, for example, the hydraulic-line diameter were increased to ¾", the pressure drop would improve to 2.8 psi/foot and 3.4 psi/foot, respectively. However, such increases in hydraulic-line dimensions are undesirable because of additional weight and size considerations. It will be apparent that a significant amount of weight and space savings in hydraulic lines can be achieved by increasing hydraulic-fluid operational temperature.

Increases in hydraulic-fluid operational temperature can also result in smaller, more lightweight, actuators. Pressure drops that occur through an actuator often require a bigger actuator piston diameter. As such, if the hydraulic-fluid viscosity were to be reduced, smaller piston sizes would be achievable. Actuator dimensions are often dependent on loads the actuator will experience and the speed with which the actuator needs to operate. Preliminary data indicate that an increase in temperature from 0° F. to 40° F. can result in as much as a 12% decrease in piston area in certain applications. Reduction in piston area means that, all other things being equal, hydraulic-system pump and reservoir sizes can be reduced and, in some cases, hydraulic-line-size requirements can also be revisited and reduced further.

Many existing passive thermal control systems utilize a valve that includes a thermostatic pellet that opens a valve; however, such valves can be prone to failure. In addition, a pilot of the aircraft usually has no control over the valve, which in a typical system opens at about 40° F. and closes at about 80° F. Because the valve only opens when it is subjected to cold temperatures, if the ground temperature is too warm, there is no way of testing the valve on the ground. Moreover, because the valve is dependent upon a thermoplastic pellet, the valve can stick open. If this happens, the aircraft can overheat, which overheating may result in not enough hydraulic-fluid flow to drive various actuators controlled by the FCC of the aircraft.

In a typical embodiment, embodiments of the thermal hydraulic active-warming system use an aircraft's FCC to provide closed-loop control of hydraulic-fluid warming actuators. Embodiments of the thermal hydraulic active-warming system typically use a plurality of active thermal-warming valves that incorporate redundant temperature sensors and redundant FCC control of operation. In a typical embodiment, an active thermal-warming valve is positioned relatively close to a hydraulic-fluid reservoir to minimize return hydraulic-line heat losses.

In some embodiments, an FCC calculates total hydraulic-fluid flow based on actuator rates and, using the total hydraulic-fluid flow calculations, controls active thermal-control-valve flow usage to minimize a need to oversize hydraulic-system components to provide for hydraulic-fluid warming. In addition, for on-ground rapid hydraulic-fluid warming, hydraulic-system valves may be commanded by an FCC to operate in a super-bleed mode that maximizes hydraulic-fluid warming flow. In flight, actuator internal leakage data may be used to provide hydraulic-fluid recirculation to maintain a minimum hydraulic-fluid temperature (e.g., 40° F.) to actuators.

In existing passive warming systems that use a thermoplastic pellet, to change the valve, the thermoplastic pellet must be changed. In contrast, with a thermal hydraulic active-warming system, the FCC can be programmed to cause the thermal hydraulic active-warming system to mandate different temperatures in accordance with operational conditions or other aircraft design considerations. Redundant sensors can be employed to sense failures. Sensor voting in the event of a failure sensed by some but not all sensors. In a typical embodiment, valves are mounted close to a pump and reservoir rather than close to the actuators. Super-bleed mode is a rapid warm-up mode of operation that permits hydraulic fluid to be pushed through an actuator very quickly to warm the hydraulic system, including the actuators, very quickly while the aircraft is on the ground. Existing leakage in the actuator will, in some embodiments, help to maintain the temperature of the actuators at acceptable levels.

Figure 1A:
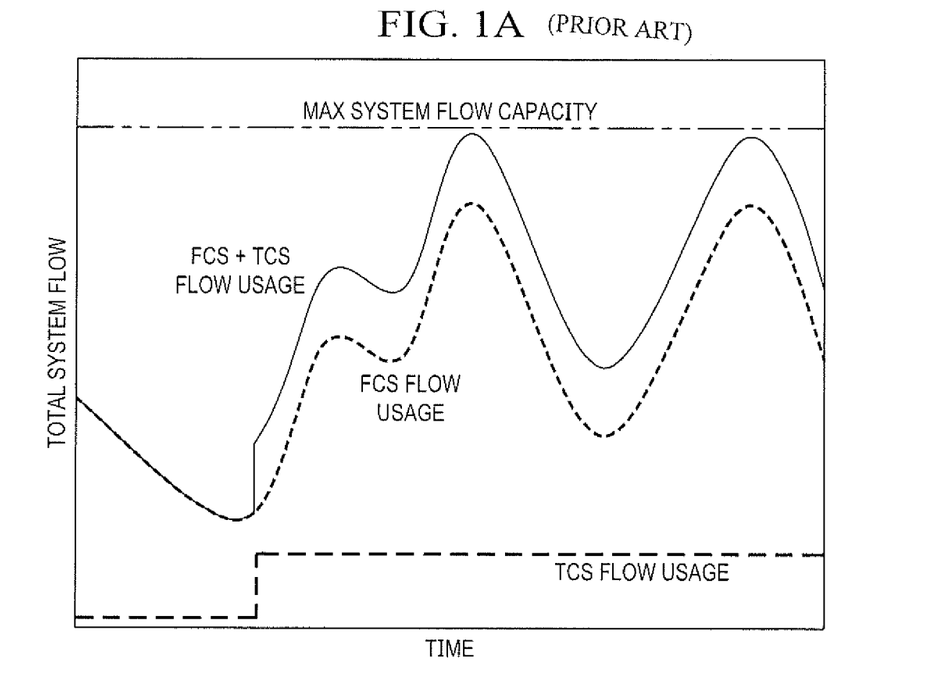
FIG. 1A is an illustration of operation of a passive warming system.

FIG. 1A is an illustration of operation of a passive warming system. FIG. 1A shows that a passive warming valve works in a stepwise fashion and without pilot or FCC control. When the valve opens, the hydraulic fluid used by the valve is added to the flight control system ("FCS") flow usage. It is important to note that total system flow must always stay below a maximum system-flow capacity level.

Figure 1B:
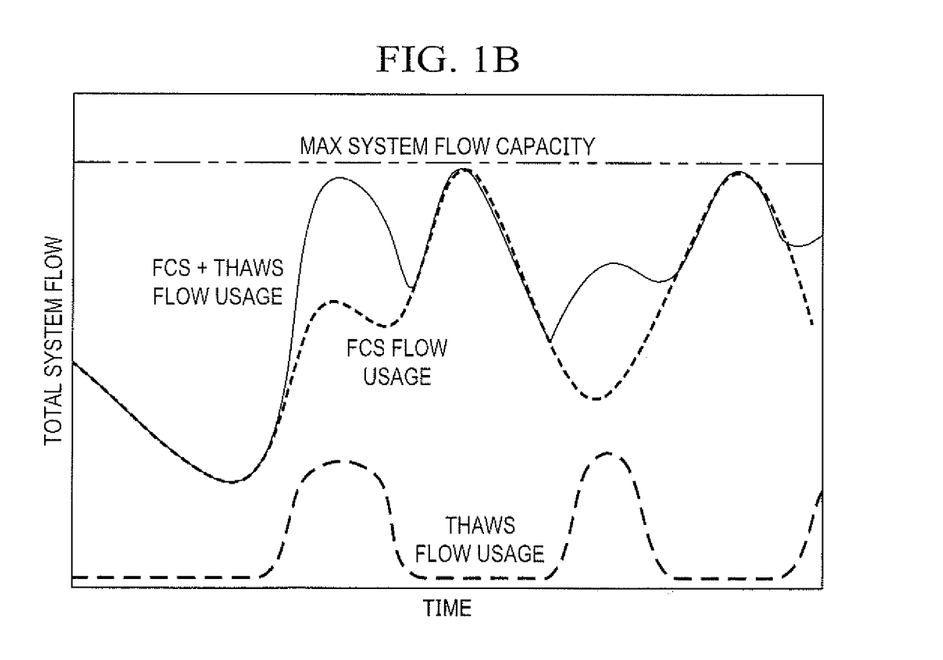
FIG. 1B is an illustration of operation of a thermal hydraulic active-warming system.

FIG. 1B is an illustration of operation of a typical thermal hydraulic active-warming system. In contrast to the system shown in FIG. 1A, with the thermal hydraulic active-warming system illustrated in FIG. 1B, the FCC can monitor total system hydraulic-fluid flow; as such, when additional hydraulic-fluid flow is available, the hydraulic-fluid flow can be used for heating. Whenever the hydraulic-fluid flow decreases due to the FCS not needing the flow, hydraulic-fluid flow can be increased for purposes of heating the hydraulic fluid. If the total system flow approaches reaches maximal system flow capacity, the FCC can operate to reduce thermal hydraulic active-warming system hydraulic-fluid flow usage so that the maximal flow capacity is not exceeded.

Figure 2A:
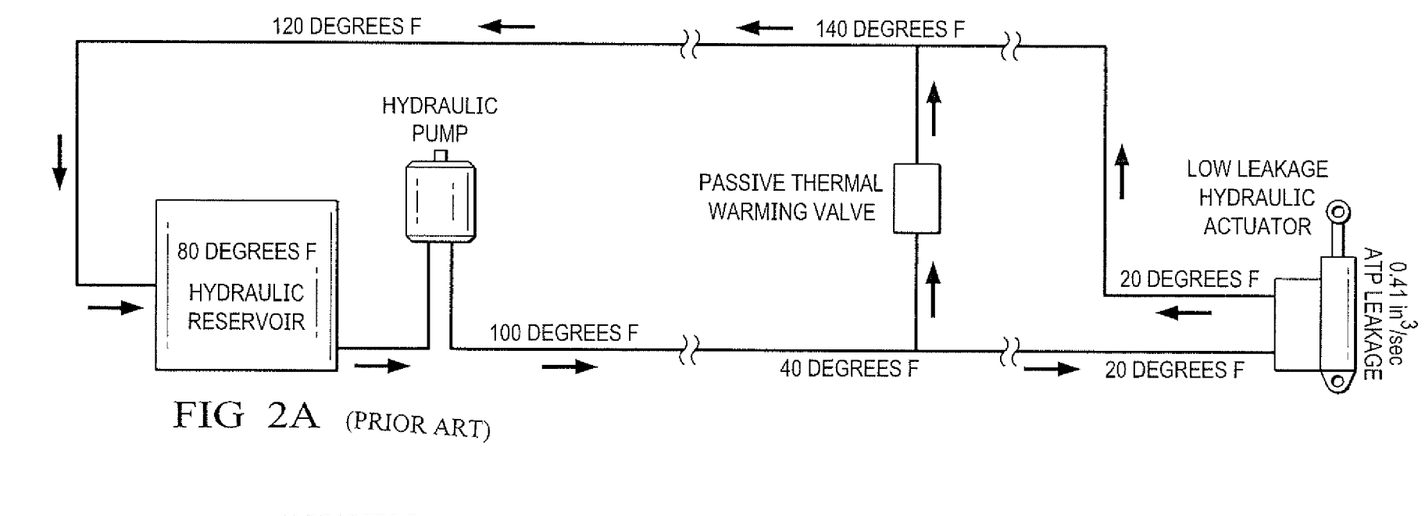
FIGS. 2A-2C illustrate two existing passive thermal warming systems and an illustrative implementation of a thermal hydraulic active-warming system.
Figure 2B:
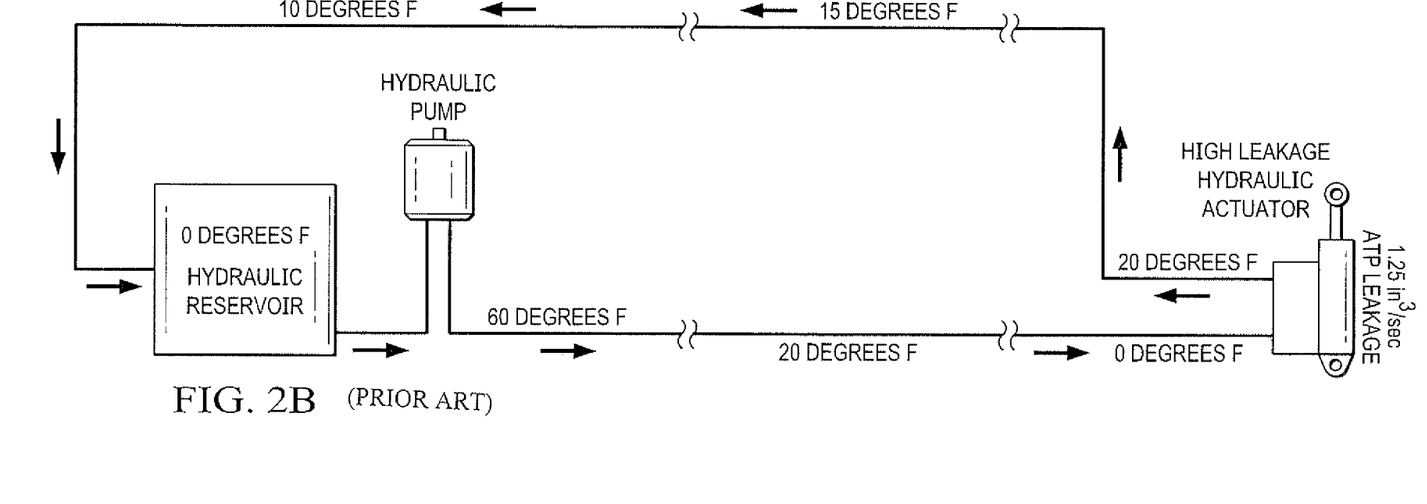
Figure 2C:
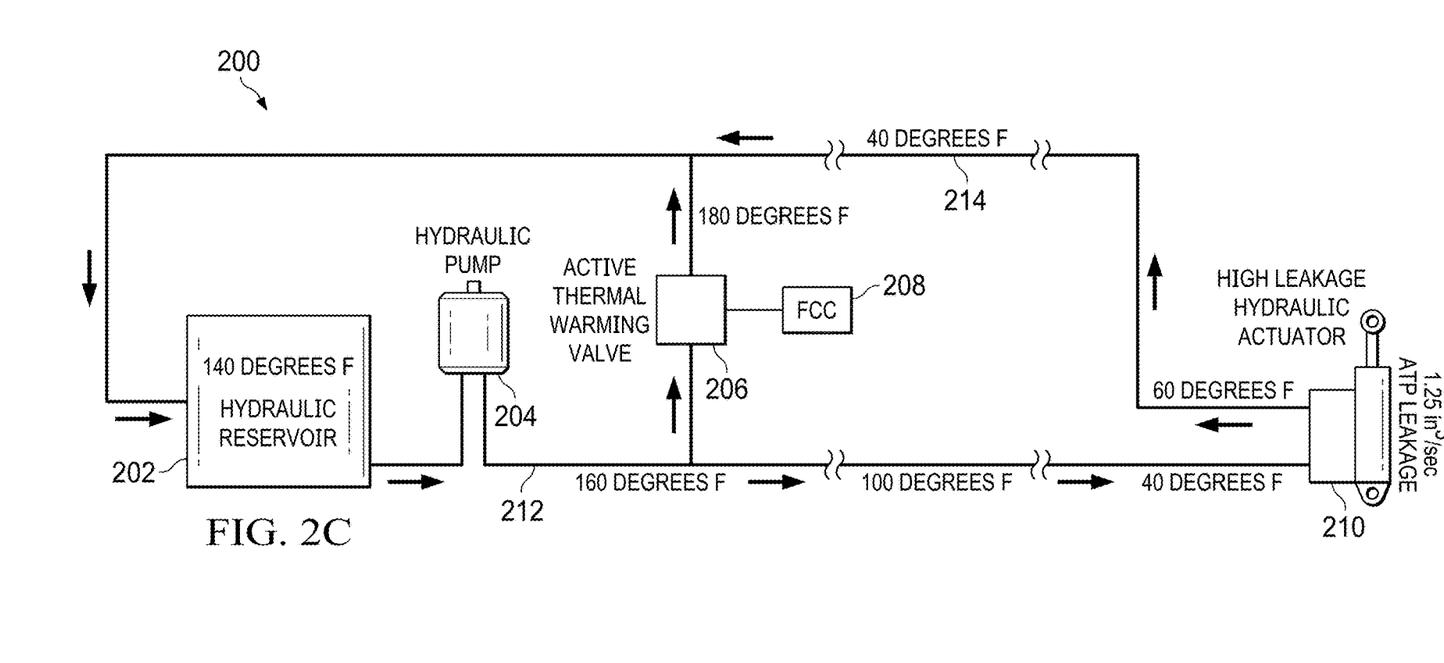

FIGS. 2A-2C illustrate two existing passive thermal warming systems and an illustrative implementation of a thermal hydraulic active-warming system. Temperatures and other details illustrated herein are examples only.

FIG. 2A illustrates an existing passive thermal warming system that uses a passive thermal warming valve installed close to a hydraulic actuator, which permits warming of hydraulic fluid in a return line back to a reservoir in order to ensure that hydraulic fluid in the return line does not get too cold and reduces delta pressure in the actuator.

FIG. 2B illustrates an existing passive thermal warming system that uses high-leakage actuators such that temperature of the hydraulic fluid is maintained without the need for a separate warming system.

FIG. 2C illustrates a typical thermal hydraulic active-warming system 200. In the thermal hydraulic active-warming system 200, hydraulic-fluid leakage of a high-leakage hydraulic actuator 210 is illustrated that increases hydraulic-fluid temperature from 40° F. to 60° F. An active thermal-warming valve 206 is positioned closer to a hydraulic pump 204 than to the high-leakage hydraulic actuator 210 such that a higher hydraulic-fluid temperature in a hydraulic reservoir 202 is achieved, an increase by the active thermal-warming valve 206 being shown as increasing temperature of hydraulic fluid to 180° F. as an example. Instead of trying to maintain 80° F. in the hydraulic reservoir 202 as in FIG. 2A or 0° F. fluid as in FIG. 2B, 140° F. can be maintained in the hydraulic reservoir 202 of the thermal hydraulic active-warming system 200. So long as the hydraulic-fluid temperature is maintained below a high-temperature thermal heat-exchanger temperature, there is no reason why the hydraulic-fluid temperature cannot be maintained as high as, for example, 140° F. so the hydraulic-fluid temperature at the high-leakage hydraulic actuator 210 is, for example, 40° F. Because hydraulic-fluid temperature at an input to the high-leakage hydraulic actuator is 40° F., the hydraulic low-pressure return line 214 will typically also be at 40° almost all the way back to the hydraulic reservoir 202.

In a typical embodiment, the thermal hydraulic active-warming system 200 does not reduce system flow available for flight control actuation; as such, no increase in hydraulic-system capacity is required. An active thermal-warming valve 206 with solenoid shutoff may incorporate chip shear capability to insure reliable shut off and prevent overheating. In some embodiments, the active thermal-warming valve 206 can be preflight checked for missions at various ambient temperatures. In some embodiments, redundant FCC control of the active thermal-warming valve 206 can provide a limp mode to maintain warm hydraulic fluid in bypassed actuators to reduce back drive loads. The limp mode permits hydraulic fluid in a failed component to continue to be kept warm so that the failed component does not prevent, for example, other hydraulic actuators from operating. An example would be a viscous fluid that acts as a damper in a failed hydraulic actuator and reduces performance of other operational actuators. With FCC control and by cross-connecting the FCC to the active thermal-warming valve 206, control of the active thermal-warming valve 206 even on a component that is dormant can be achieved.

When the thermal hydraulic active-warming system 200 is used, greater fluid warming temperatures may ensure that empennage hydraulic actuators receive adequate warm hydraulic fluid despite distances from the hydraulic pump 204 and the hydraulic reservoir 202. In addition, a hydraulic actuator super-bleed mode may be utilized in some embodiments for rapid warming of hydraulic-system components. Moreover, FCC control of hydraulic-fluid temperatures may allow use of different hydraulic fluids with only a software change.

FIG. 3A-3E illustrate an active thermal-warming valve for use in illustrative thermal hydraulic active-warming systems. The active thermal-warming valves illustrated herein are only examples. Those having skill in the art will appreciate that many different active thermal-warming valve designs may be employed without departing from the principles discussed herein.

Figure 3A:
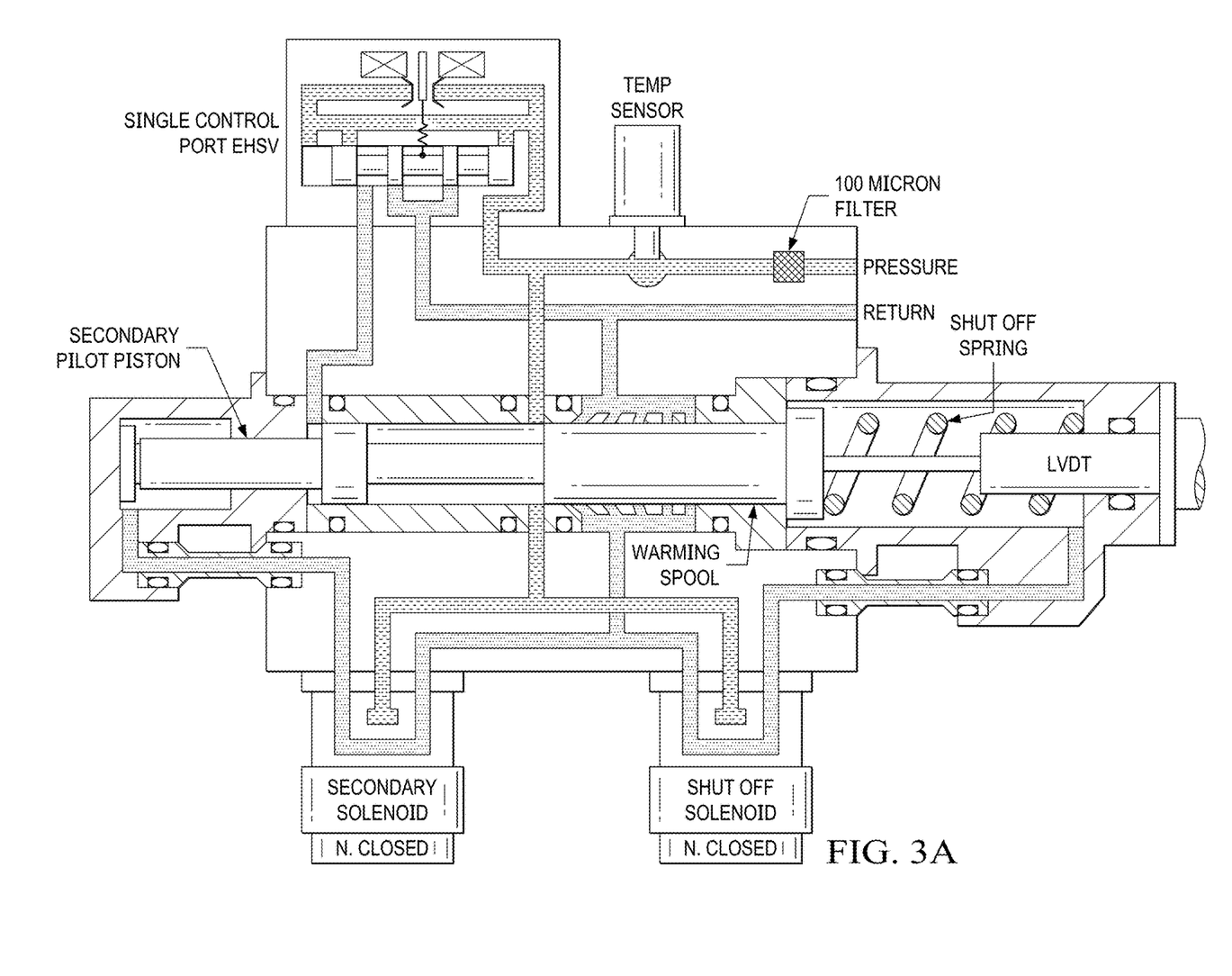
FIG. 3A-3E illustrate a valve for use in an illustrative thermal hydraulic active-warming system.

FIG. 3A illustrates an active thermal-warming valve in a deactivated mode. The active thermal-warming valve has a spool warming valve that can be repositioned such that it opens up a series of ports. When warmer hydraulic fluid is desired, more ports are opened up. A position of the spool is detected by a linear voltage displacement transducer ("LVDT"). Also shown is a fluid temperature sensor.

Figure 3B:
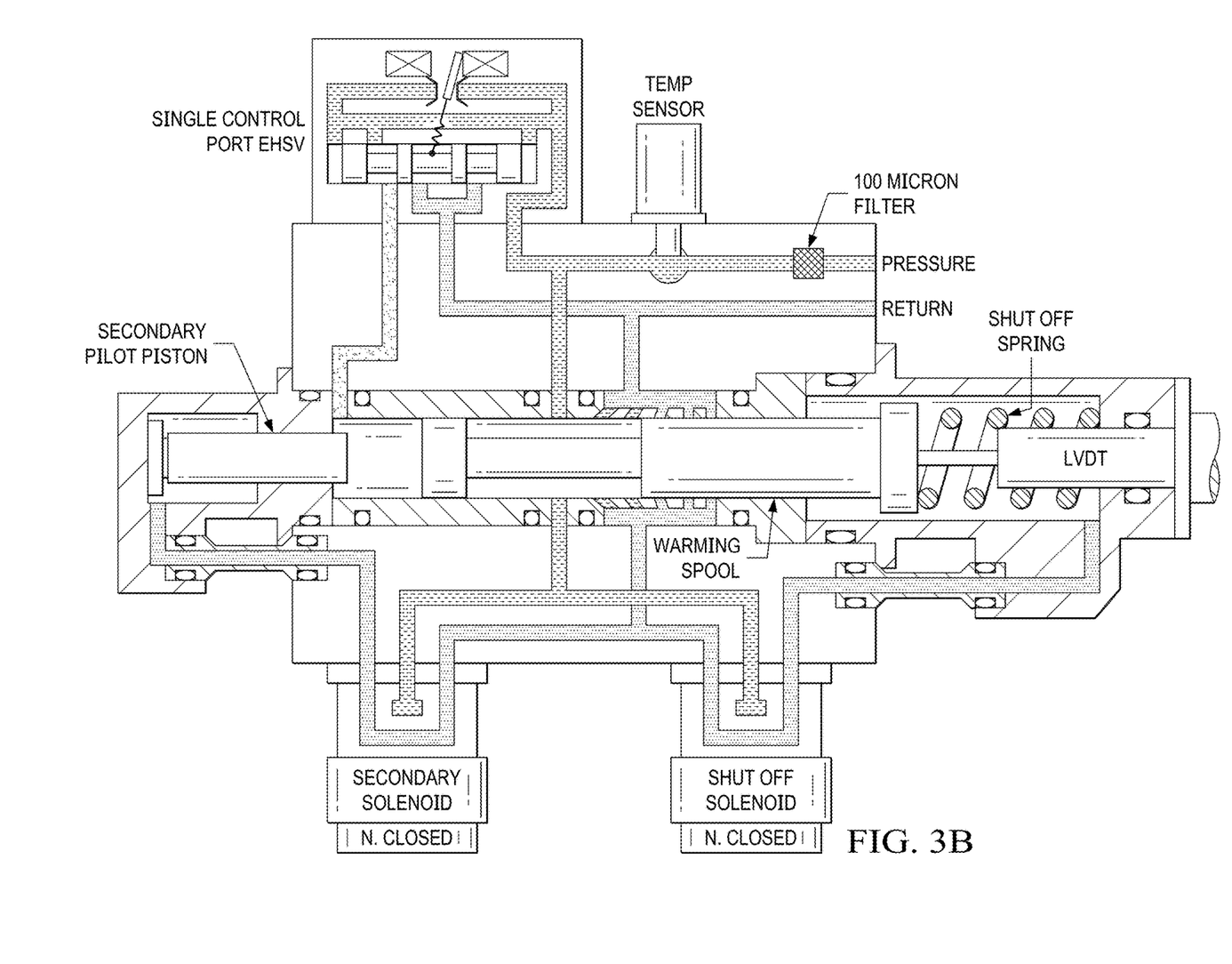

FIG. 3B illustrates the active thermal-warming valve of FIG. 3A in an activated partial-flow mode. The active thermal-warming valve has been commanded to about 50% flow. A left side of the warming spool is pressurized and is now opening up ports to generate hydraulic-fluid warming.

Figure 3C:
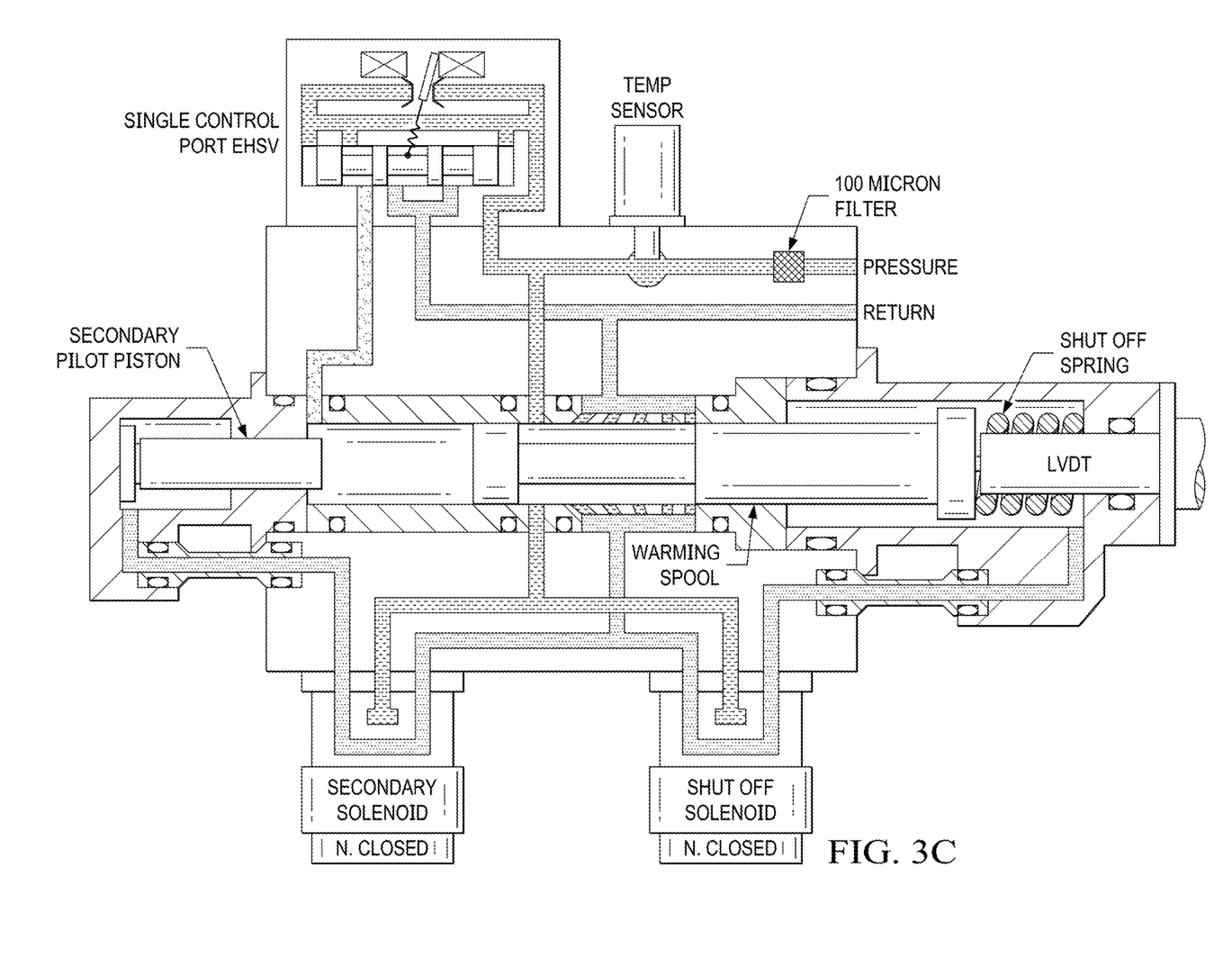

FIG. 3C illustrates the active thermal-warming valve in an activated full-flow mode. The warming spool is pushed to the far right such that all of the ports are open and maximal warming capability of the valve is achieved. In a typical embodiment, an FCC may modulate the warming spool at any position between fully closed and fully open to maintain a desired hydraulic-fluid temperature.

Figure 3D:
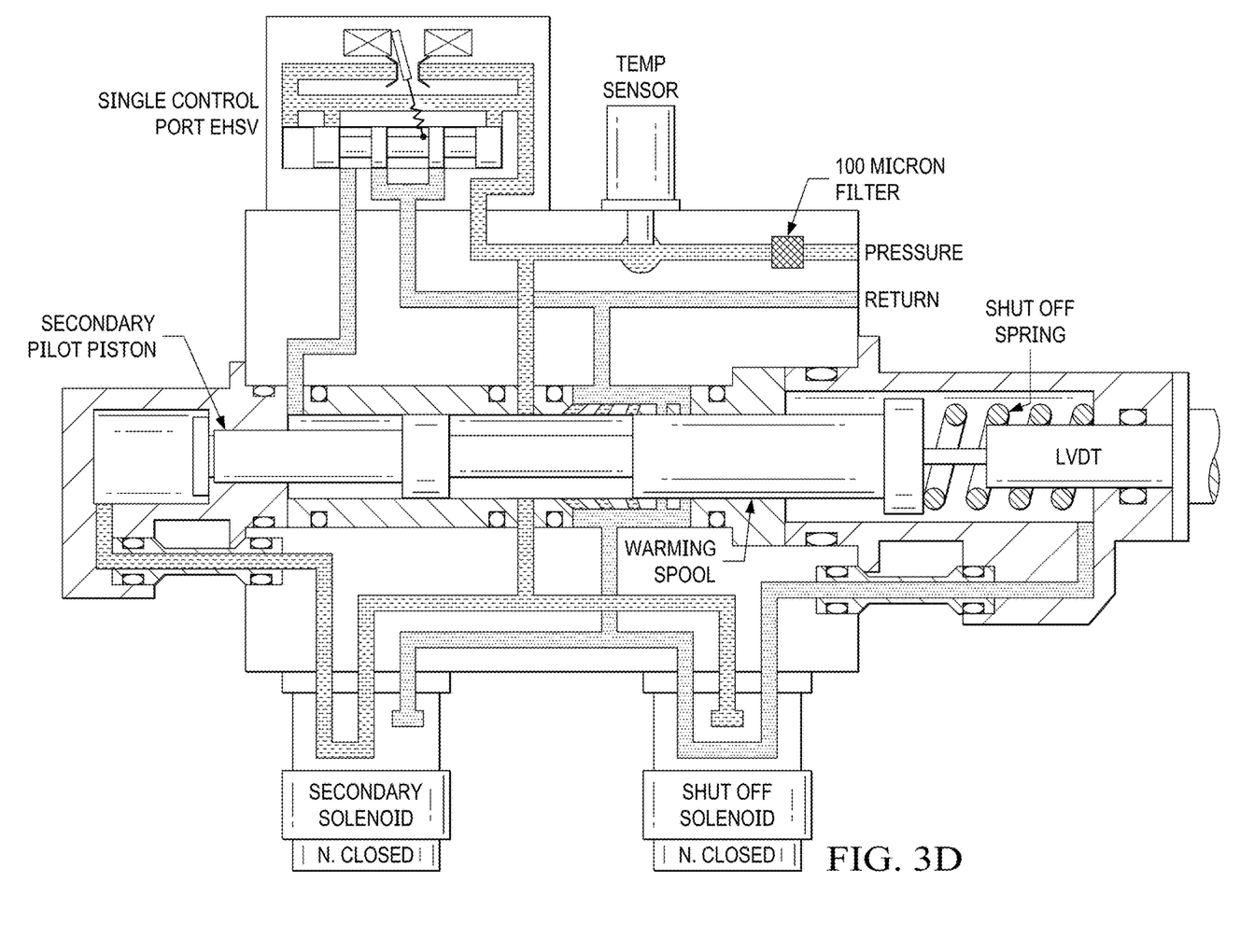

FIG. 3D illustrates the active thermal-warming valve in limp mode. The limp mode is used, for example, if the thermal hydraulic active-warming system fails and it is desired that dormant hydraulic actuators not get too cold. A secondary solenoid pushes on a secondary pilot piston to open the warming spool to a preset position that is not controlled other than to be partially opened or partially closed.

Figure 3E:
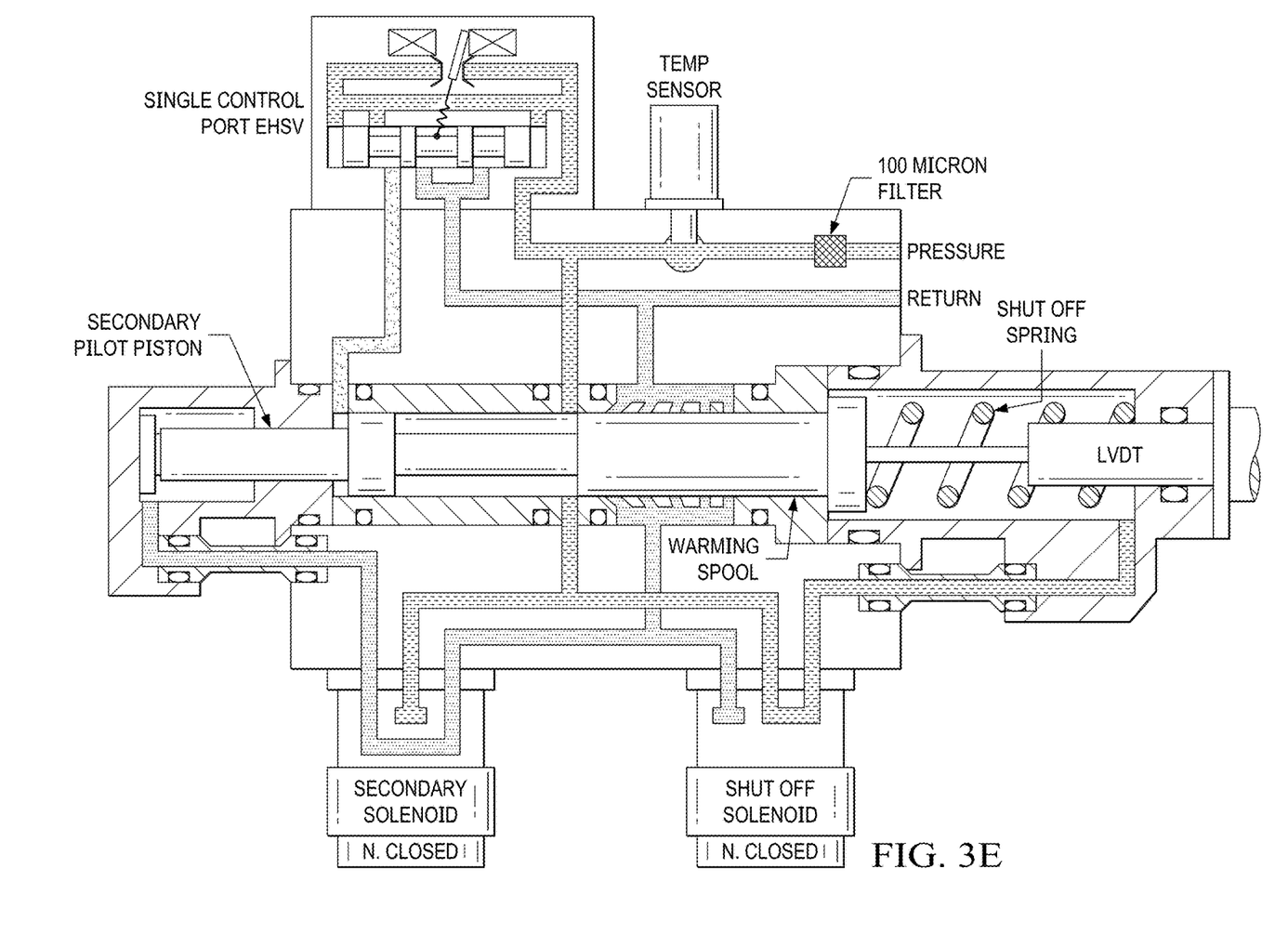

FIG. 3E illustrates the active thermal-warming valve in a shut-off mode. If, for example, the active thermal-warming valve sticks open and the thermal hydraulic active-warming system is overheated or if there is inadequate hydraulic-fluid flow for in-flight usage, the shut-off mode may be employed. A secondary solenoid shown on the right side of the active thermal-warming valve drives pressure onto the right-hand side of the warming spool to force it closed in the event, for example, of a failure of the FCC or another component. The shut-off mode provides a level of redundancy and capability that is not possible with a passive thermal system.

In addition to the active thermal-warming valve illustrated in FIGS. 3A-3E, other valve designs could include thermal control valves that allow for automatic control of warming flow rate through FCC control or other control via an alternate electronic control unit. Control may be implemented through evaluation of system temperature, system duty, and system capability in order to ensure that warming flow and system duty do not exceed system capability limits.

Illustrative active thermal-warming valves that allow for automatic or manual engagement of the thermal hydraulic active-warming system using electronic control of solenoid or motor-actuated valves may be employed. In addition, active thermal-warming valves that allow for automatic or manual isolation of the thermal hydraulic active-warming system using electronic control of solenoid or motor-actuated valves may be employed. Moreover, active thermal-warming valves that meter flow using proportional control or step-wise control via multiple metering orifices are envisioned. In some embodiments, active thermal-warming valves that allow for metered flow using single, dual, triple, other multistage valve configurations of meter flow as commanded by the FCC or other control computer may be implemented. Active thermal-warming valves that monitor control valve stage positions for the purpose of assessing valve health may be utilized, active thermal-warming valves that monitor control valve stage positions for the purpose of assessing a valve operating point, active thermal-warming valves that allow for a combination of methods to actuate the flow control stage allowing for redundant control of the warming system, and active thermal-warming valves that employ a simplex, duplex, triplex, or other multi-system combination valves actuated by a motor or valve-controlled piston arrangement employing simplex, duplex, triplex, or other combination of electronic control may be employed. Multi-system configurations may also employ 'rip stop' configurations to improve safety.

Figure 4A:
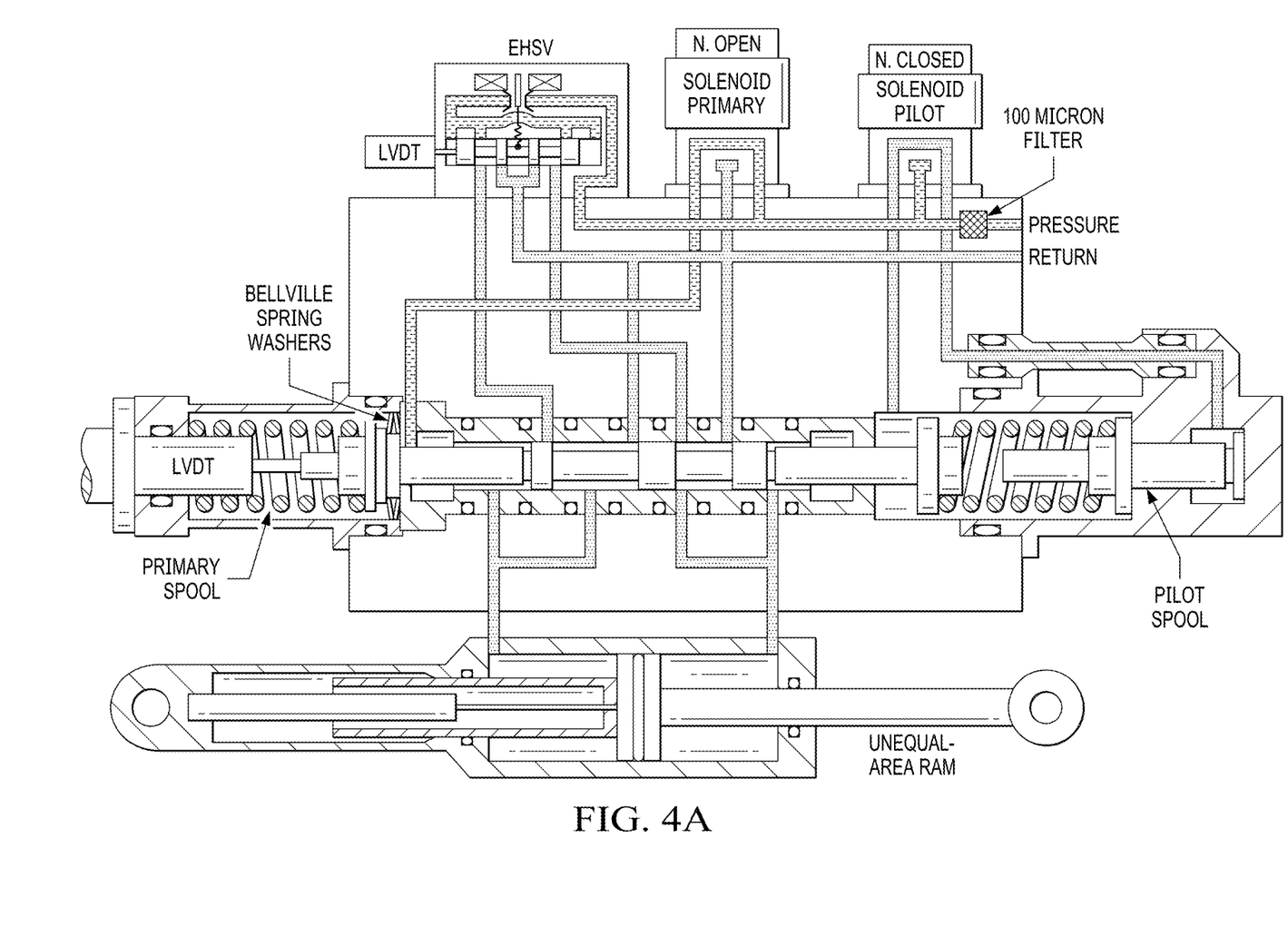
FIG. 4A illustrates a hydraulic actuator in a bypass mode.
Figure 4B:
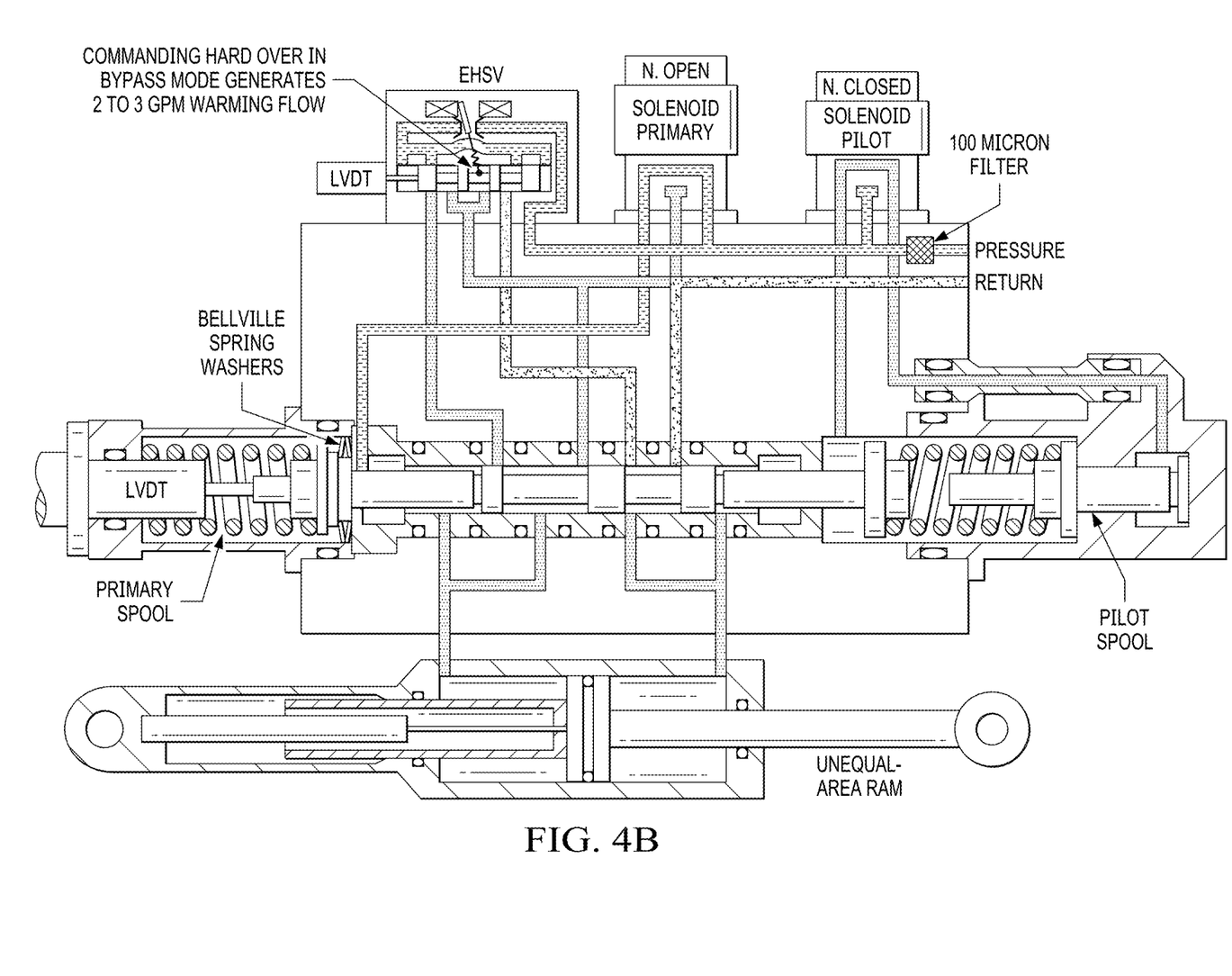
FIG. 4B illustrates a hydraulic actuator in a super-bleed mode.

FIG. 4A illustrates a hydraulic actuator in a bypass mode. FIG. 4B illustrates the hydraulic actuator in a super-bleed mode. In the bypass mode, the hydraulic actuator is not being operated and has no hydraulic-fluid flow therethrough. In the super-bleed mode of the hydraulic actuator, a return line out of the hydraulic actuator is shown to have hydraulic fluid flowing therethrough such that the hydraulic fluid has been warmed. This flow through the hydraulic actuator occurs by virtue of a command to a servo valve to operate in a condition to cause flow through the hydraulic actuator in what would normally be considered a failure mode; however, for this purpose, the failure mode is purposefully being commanded, for example, on the ground to cause hydraulic-system warming.

Figure 5:
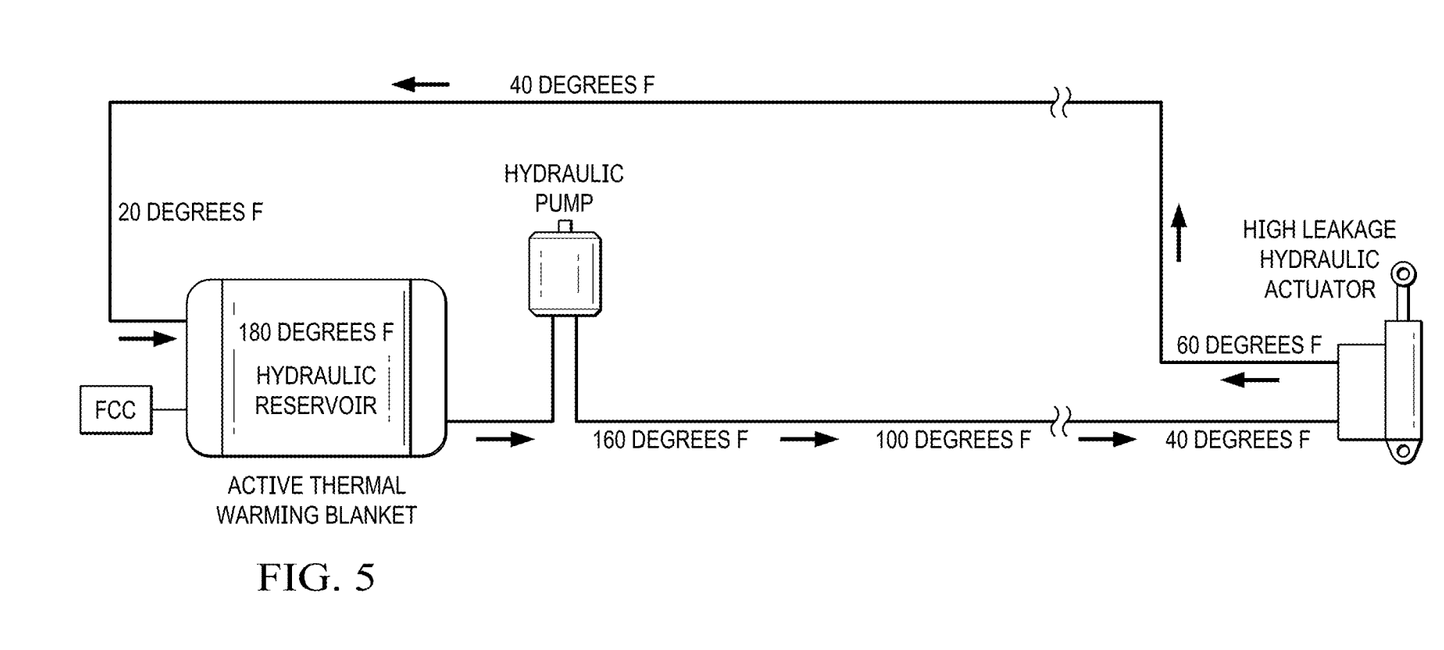
FIG. 5 illustrates an embodiment of a thermal hydraulic active-warming system in which an electric blanket is wrapped around a hydraulic reservoir to warm up the hydraulic fluid.

In FIG. 5, another illustrative embodiment of a thermal hydraulic active-warming system is shown in which an active thermal warming electric blanket is wrapped around a hydraulic reservoir to warm up the hydraulic fluid.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. An aircraft thermal hydraulic active-warming system comprising:
   an active thermal-warming valve interoperably coupled between a hydraulic pressure line and a hydraulic low-pressure return line;
   a hydraulic actuator arranged in parallel with the active thermal-warming valve between the hydraulic pressure line and the hydraulic low-pressure return line;
   a hydraulic reservoir arranged in parallel with the hydraulic actuator and the active thermal-warming valve between the hydraulic pressure line and the hydraulic low-pressure return line; and
   an aircraft flight control computer coupled to the active thermal-warming valve, wherein the aircraft flight control computer is configured to:
      monitor total system hydraulic-fluid flow usage and determine if additional hydraulic-fluid flow is available, wherein the additional hydraulic fluid flow is the difference between system hydraulic-fluid flow capacity and the total system hydraulic-fluid flow usage; and
      responsive to a determination that the additional hydraulic-fluid flow is available, at least a portion of the additional hydraulic-fluid flow is used to generate heat;
   wherein the active thermal-warming valve is positioned between the hydraulic reservoir and the hydraulic actuator; wherein a distance between the active thermal-warming valve and the hydraulic reservoir is shorter than a distance between the active thermal-warming valve and the hydraulic actuator.

2. The aircraft thermal hydraulic active-warming system of claim 1, comprising a hydraulic pump arranged in series with the hydraulic reservoir between the hydraulic reservoir and the active thermal-warming valve on the hydraulic pressure line.

3. The aircraft thermal hydraulic active-warming system of claim 2, wherein the aircraft flight control computer calculates total system hydraulic-fluid flow supplied by the hydraulic pump based on actuator rates and controls active thermal-warming-valve flow using the total system hydraulic-fluid flow calculations.

4. The aircraft thermal hydraulic active-warming system of claim 1, wherein the hydraulic actuator is a high-leakage hydraulic actuator.

5. The aircraft thermal hydraulic active-warming system of claim 1, wherein the active thermal-warming valve is operable in at least two of a deactivated mode, a partial-flow mode, a full-flow mode, a limp mode, and a shut-off mode.

6. The aircraft thermal hydraulic active-warming system of claim 1, wherein the active thermal-warming valve is operable in a deactivated mode such that hydraulic fluid does not flow through the active thermal-warming valve.

7. The aircraft thermal hydraulic active-warming system of claim 1, wherein the active thermal-warming valve is operable in a partial-flow mode such that hydraulic fluid flows through the active thermal-warming valve in an intermediate amount between a deactivated mode and a full-flow mode.

8. The aircraft thermal hydraulic active-warming system of claim 1, wherein the active thermal-warming valve is operable in a full-flow mode such that hydraulic fluid flows through the active thermal-warming valve at a maximal amount.

9. An aircraft thermal hydraulic active-warming method comprising:
   warming hydraulic fluid by an active thermal-warming valve interoperably coupled between a hydraulic pressure line and a hydraulic low-pressure return line;
   operating a hydraulic actuator arranged in parallel with the active thermal-warming valve between the hydraulic pressure line and the hydraulic low-pressure return line;
   controlling the active thermal-warming valve via an aircraft flight control computer interoperably coupled to the active thermal-warming valve, wherein the aircraft flight control computer is configured to:

monitor total system hydraulic-fluid flow usage and determine if additional hydraulic-fluid flow is available, wherein the additional hydraulic fluid flow is the difference between system hydraulic-fluid flow capacity and the total system hydraulic-fluid flow usage; and responsive to a determination that the additional hydraulic-fluid flow is available, using at least a portion of the additional hydraulic-fluid flow to generate heat; and storing the hydraulic fluid by a hydraulic reservoir arranged in parallel with the hydraulic actuator and the active thermal-warming valve between the hydraulic pressure line and the hydraulic low-pressure return line;

wherein the active thermal-warming valve is positioned between the hydraulic reservoir and the hydraulic actuator; wherein a distance between the active thermal-warming valve and the hydraulic reservoir is shorter than a distance between the active thermal-warming valve and the hydraulic actuator.

10. The aircraft thermal hydraulic active-warming method of claim 9, comprising pumping the hydraulic fluid by a hydraulic pump arranged in series with the hydraulic reservoir between the hydraulic reservoir and the active thermal-warming valve on the hydraulic pressure line.

11. The aircraft thermal hydraulic active-warming method of claim 10, wherein the controlling comprises the aircraft flight control computer calculating total system hydraulic-fluid flow supplied by the hydraulic pump based on actuator rates and controlling active thermal-warming-valve flow using the total system hydraulic-fluid flow calculations.

12. The aircraft thermal hydraulic active-warming method of claim 9, wherein the hydraulic actuator is a high-leakage hydraulic actuator.

13. The aircraft thermal hydraulic active-warming method of claim 9, warming comprises operating the active thermal-warming valve in at least two of a deactivated mode, a partial-flow mode, a full-flow mode, a limp mode, and a shut-off mode.

14. The aircraft thermal hydraulic active-warming method of claim 9, comprising the active thermal-warming valve operating in a deactivated mode such that the hydraulic fluid does not flow through the active thermal-warming valve.

15. The aircraft thermal hydraulic active-warming method of claim 9, wherein the warming comprises the active thermal-warming valve operating in a partial-flow mode such that the hydraulic fluid flows through the active thermal-warming valve in an intermediate amount between a deactivated mode and a full-flow mode.

16. The aircraft thermal hydraulic active-warming method of claim 9, wherein the warming comprises the active thermal-warming valve operating in a full-flow mode such that the hydraulic fluid flows through the active thermal-warming valve at a maximal amount.

* * * * *